FLUTTER CORRECTING CIRCUIT FOR MAGNETIC PLAYBACK SYSTEM

Filed July 18, 1955 4 Sheets-Sheet 1

INVENTOR.
CLIFFORD E. BERRY

BY Christie, Parker & Hale
ATTORNEYS

March 14, 1961 C. E. BERRY 2,975,240

FLUTTER CORRECTING CIRCUIT FOR MAGNETIC PLAYBACK SYSTEM

Filed July 18, 1955 4 Sheets-Sheet 2

INVENTOR.
CLIFFORD E. BERRY

BY

Christie, Parker & Hale
ATTORNEYS

INVENTOR.
CLIFFORD E. BERRY
BY
Christie, Parker & Hale
ATTORNEYS

INVENTOR.
CLIFFORD E. BERRY
BY
Christie, Parker & Hale
ATTORNEYS

United States Patent Office 2,975,240

Patented Mar. 14, 1961

2,975,240

FLUTTER CORRECTING CIRCUIT FOR MAGNETIC PLAYBACK SYSTEM

Clifford E. Berry, Altadena, Calif., assignor, by mesne assignments, to Consolidated Electrodynamics Corporation, Pasadena, Calif., a corporation of California Filed July 18, 1955, Ser. No. 522,696

8 Claims. (Cl. 179—100.2)

This invention relates to improvements in apparatus for compensating for variations in the speed of a recording medium which occur while frequency-modulated signals are being recorded on and reproduced from the recording medium.

Magnetic tape recorders and reproducers are subject to unwanted speed variations in the tape transport system. Such speed variations are largely confined to the frequency range between 0 to 300 cycles per second, and such speed variations are usually called "flutter."

Information is frequently recorded on tape in the form of frequency-modulated signals because such signals can be reproduced from the tape with great fidelity. In order to reproduce information which is recorded in the form of frequency-modulated signals, the information should be played back at the same speed as that at which it was recorded. Usually this is achieved by recording a reference signal having a substantially constant frequency in a channel alongside the channel in which the desired information is recorded. The reference signal is employed during playback to control the speed of the recording medium so that the recorded information passes a playback head at substantially the same speed as it passed the recording head when it was recorded.

Such an arrangement is subject to the disadvantage that a separate channel is required for the reference signal, thereby limiting the number of channels on the recording medium that may be employed to record the desired information. Also, such an arrangement does not compensate for inaccuracies which result due to skew of the recording medium as it passes by the recording or the playback head. If the recording medium is subjected to small oblique movements in addition to the desired longitudinal movement, such as may be caused by irregularities in the transport system, the reference signal and the information signal do not remain precisely in step, and the information can not be reproduced with great accuracy.

These difficulties may be overcome by recording the desired information and a reference signal along the same channel of the recording medium. The constant frequency reference signal is recorded in the form of a frequency-modulated signal, and a suppressed-carrier signal which is modulated in accordance with the information to be reproduced is recorded along the same channel in the form of frequency-modulated signals. With such an arrangement, the frequencies of the reference signal and the information signal may be arranged so that they do not interfere with one another even though they are recorded along the same channel. Co-pending application Serial No. 447,352, which was filed on August 2, 1954 in the names of Howard D. Shekels and George B. Newhouse, discloses various arrangements for recording and reproducing information in this manner.

The playback apparatus in such arrangements produces certain signals which vary in accordance with flutter in the recording and reproducing apparatus. In accordance with the present invention, these signals are employed to control the magnitude of the signals which are produced at the output of the demodulator so as to compensate for changes in the speed of the recording medium.

The correction signal may be derived from changes in the amplitude of the reference signal which is reproduced in the playback apparatus. In the alternative, the correction signal may be derived from the low frequency output of the demodulator for the frequency-modulated signals, since it carries the signal components which are derived from the frequency-modulated signals due to variations in the speed of the recording medium.

The control apparatus of the present invention is particularly suitable for use in multiple track systems because each channel carries all of the information required for its own correction.

The invention is explained in detail with reference to the drawings, in which.

Figure 1:
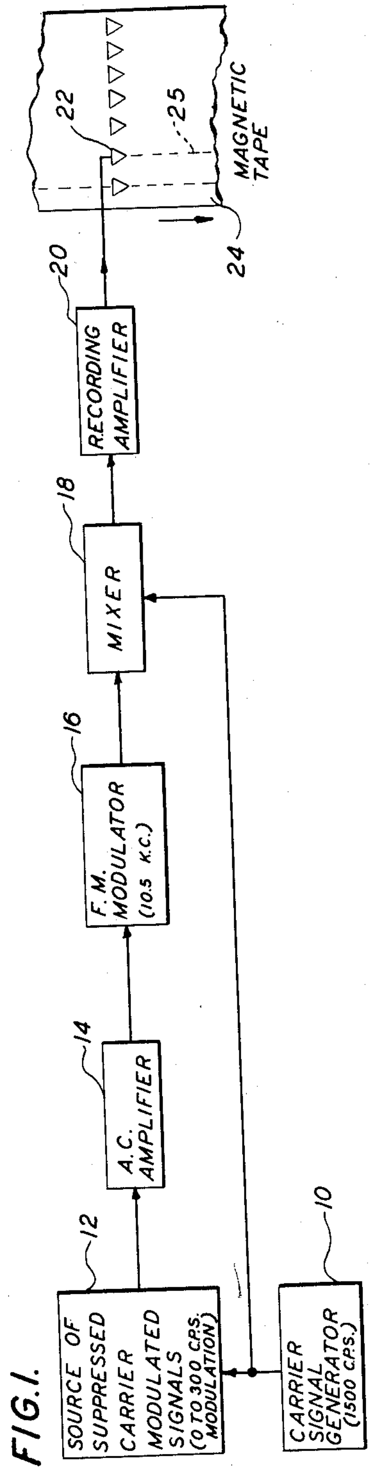
Figs. 1 and 2 show one arrangement for recording and reproducing intelligence employing one flutter correction technique of the present invention.

With reference to Fig. 1, a carrier signal generator 10 produces a carrier signal of substantially constant amplitude, and this signal is applied to a source 12 which produces a suppressed-carrier signal which is modulated in accordance with the intelligence which is to be reproduced.

The suppressed-carrier modulated signal is applied through an A.C. amplifier 14 to a frequency modulator 16 which produces a frequency-modulated version of the suppressed-carrier modulated signal. The output of the frequency modulator and also the carrier signal from the generator 10 are applied to a mixer 18. The output of the mixer is applied through a recording amplifier 20 to a magnetic recording head 22. A magnetic tape 24 is passed adjacent the recording head at a substantially constant speed, and the carrier signal and the frequency-modulated signals are magnetically recorded along the same track 25 on the tape.

Ordinarily, a plurality of recording heads are located across the tape for recording signals along other tracks on the tape. All of the information required to reproduce the recorded intelligence is carried in the respective signal tracks along the tape, and an additional track or tracks for recording a reference signal are not required.

The modulation technique which is employed in the apparatus of Fig. 1 is sometimes referred to as "compound modulation." This is because the intelligence to be reproduced is first modulated on a suppressed-carrier signal, and then the suppressed-carrier modulated signal is applied to a frequency modulator which provides a frequency-modulated version of the suppressed-carrier modulated signal.

Figure 2:
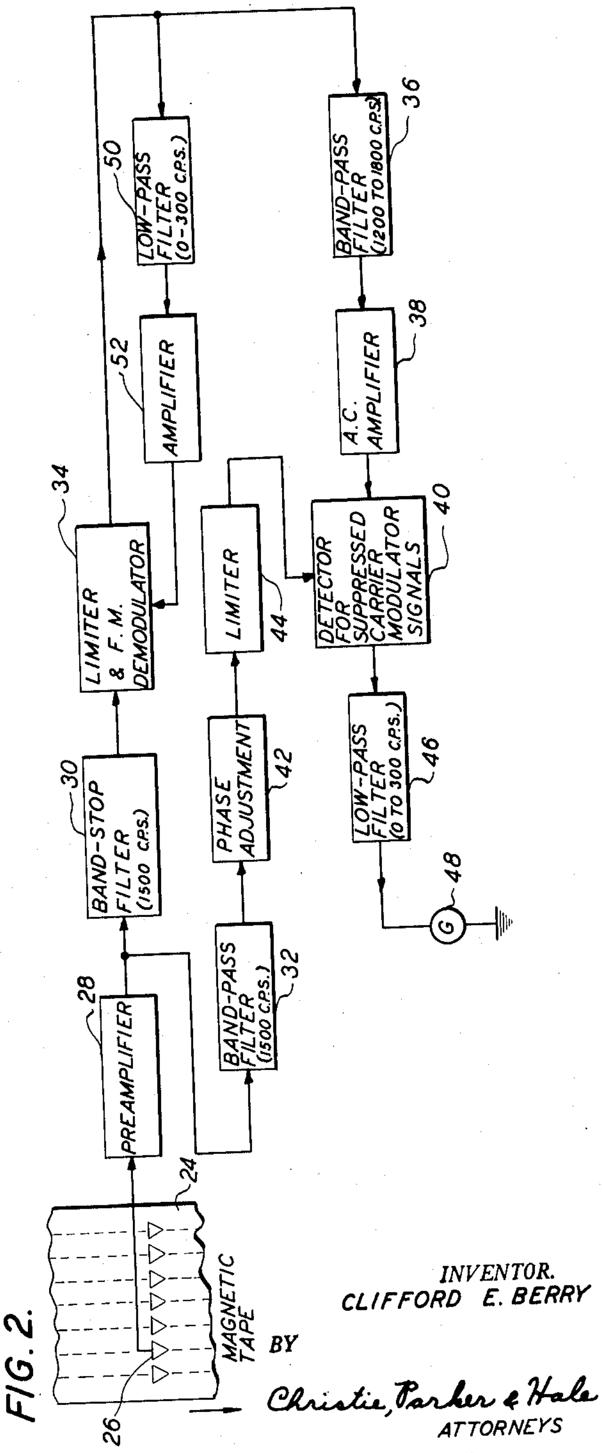

Fig. 2 illustrates an arrangement for playing back magnetic tape carrying information which was recorded by the apparatus of Fig. 1. The tape is passed adjacent a reproducing head 26 which provides output signals in accordance with the magnetically recorded signals on the tape.

The output of the reproducing head is applied through a preamplifier 28 to a pair of filters 30 and 32. The filter 30 is of the band-stop type which is tuned to the frequency of the carrier signal so that it passes only the compound modulation signal. The signal which is passed by the filter 30 is applied to a limiter and demodulator 34 which converts the frequency-modulated signal to a suppressed-carrier modulated signal. The output of the demodulator 34 is applied to a band-pass filter 36 which is tuned to pass the frequency band of the suppressed-carrier modulated signal. The output of the filter 36 is applied through an A.C. amplifier 38 to a detector 40 which serves to demodulate the suppressed-carrier modulated signals.

A reference signal having the same frequency and phase as the carrier signal is applied to the detector 40 so that the suppressed-carrier modulated signal may be demodulated. The band-pass filter 32 passes the carrier signal which is produced at the output of the preamplifier 28, and its output is coupled to a phase adjustment 42 which may be manually adjusted to compensate for any phase shifts which may be introduced by the various components of the recording and reproducing apparatus. The output of the phase adjustment is applied to a limiter 44 which serves to provide a signal of substantially constant amplitude having the same frequency as that of the carrier.

The detector 40 may be any type which serves to demodulate a suppressed-carrier modulated signal in response to a carrier signal and a suppressed-carrier modulated signal applied to its input. By way of example, the detector 40 may be a phase-sensitive A.M. demodulator of the type disclosed in the book "Waveforms" by Chance et al., MIT, vol 19, p. 511, published by McGraw-Hill Book Co., 1949.

The output of the detector 40 represents the original intelligence which was presented in suppressed-carrier modulated form. This output signal is applied through a low-pass filter 46 which is tuned to pass the frequency of the intelligence to be reproduced, and the output of the filter 46 may be applied to any suitable reproducing device such as the galvanometer 48.

The frequencies for a specific arrangement of the recording and reproducing apparatus of Figs. 1 and 2 are illustrated in the drawings. The carrier signal produces a signal of 1500 cycles per second which is to be modulated by intelligence which varies between 0 and 300 cycles per second. With such an arrangement, the suppressed-carrier modulated signal has a frequency range of 1200 to 1800 cycles per second. Such a frequency range may be conveniently frequency-modulated on a 10.5 kilocycle center frequency.

Thus, in the apparatus of Fig. 1, a 10.5 kilocycle frequency-modulated signal and a carrier signal of 1500 cycles per second are recorded magnetically on the tape. These signals are reproduced by the apparatus of Fig. 2, and the frequency-modulated signal is demodulated by the demodulator 34 to provide a suppressed-carrier modulated signal having a frequency range of 1200 to 1800 cycles per second. This signal is passed by the filter 36 and applied through the amplifier 38 to the detector 40.

The carrier signal is passed by the filter 32 and it is applied through the phase adjustment 42 and the limiter 44 to the detector 40. The detector reproduces the original intelligence, and its output, which may vary between 0 and 300 cycles per second, is applied through the filter 46 to the galvanometer 48.

The effect of speed variations in the tape during playback, with respect to the speed of the tape during recording, is to produce amplitude variations in the output signal from the F.M. demodulator. This is because a percentage change in the appareant carrier frequency, due to tape speed shift, produces an equal percentage change in the F.M. modulation side bands. The same percentage change in frequencies at two different average or center frequencies does not result in the same absolute frequency change. Therefore, as the apparent center frequency of the F.M. modulated signal is shifted by changes in the tape speed, the absolute frequency changes due to the modulation are increased or decreased by the same percentage. The demodulator output, however, is a direct function of the absolute frequency change and not of the percentage change. As a result, there is a change in amplitude of the demodulated output with changes in tape speed.

The output of the demodulator 34 contains in addition to the amplitude modulation side bands, a direct current signal which is proportional to the center frequency of the F.M. modulator 16 and to the average tape speed, and alternating current flutter signals which are caused by variations in the speed of the recording and the reproducing tape transport system. In accordance with the embodiment of the invention shown in Fig. 2, the alternating current signals which are caused by flutter in the tape transport systems are employed to control the action of the demodulator so as to compensate for the flutter.

This control action is achieved by coupling a low-pass filter 50 to the output of the demodulator 34, and by applying the output of the low-pass filter 50 through an amplifier 52 to a control arrangement in the demodulator for controlling the magnitude of the output signals which are provided by the demodulator inversely with the magnitude of the signals which are provided through the low-pass filter. As a result, the changes in amplitude in the output of the demodulator due to speed variations in the tape are substantially balanced out by the negative feedback effect of the control action.

This control arrangement corrects only the amplitude of the output signal and it does not correct the time scale. Ordinarily, the average tape speed is maintained substantially constant by a servo system in order to maintain the correct average time scale. If the average tape speed is controlled, the amplifier 52 may be an alternating current type because the tape speed control will correct for any low speed variations of the tape and the amplifier 52 will not be required to pass extremely low frequencies. If the average speed is not closely controlled, the amplifier 52 should be a direct current type so that it will respond to extremely low frequency signals. In this case, the center frequency of the F.M. modulator 16 should be closely controlled because the demodulator 34 provides a direct current signal which is proportional to the center frequency of the F.M. modulator. Hence, variations in the center frequency of the F.M. modulator cause variations in the direct current signal output of the demodulator 34, and the correction circuit cannot distinguish between a drift in the center frequency of the F.M. modulator and a change in tape speed if the amplifier 52 is a direct current type.

Figure 3:
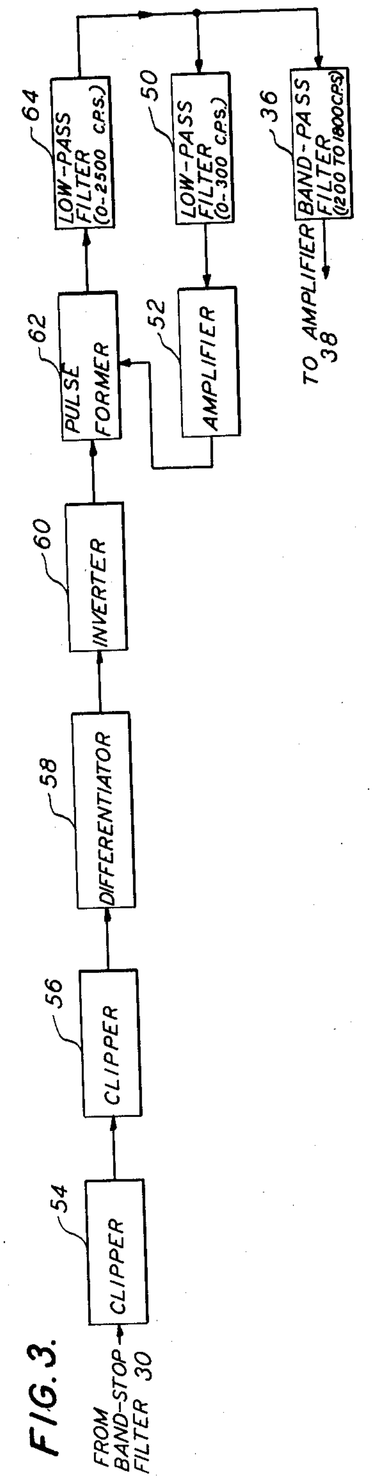
Figs. 3 and 4 show two demodulator arrangements which may be employed in the apparatus of Fig. 2.
Figures 4, 5:
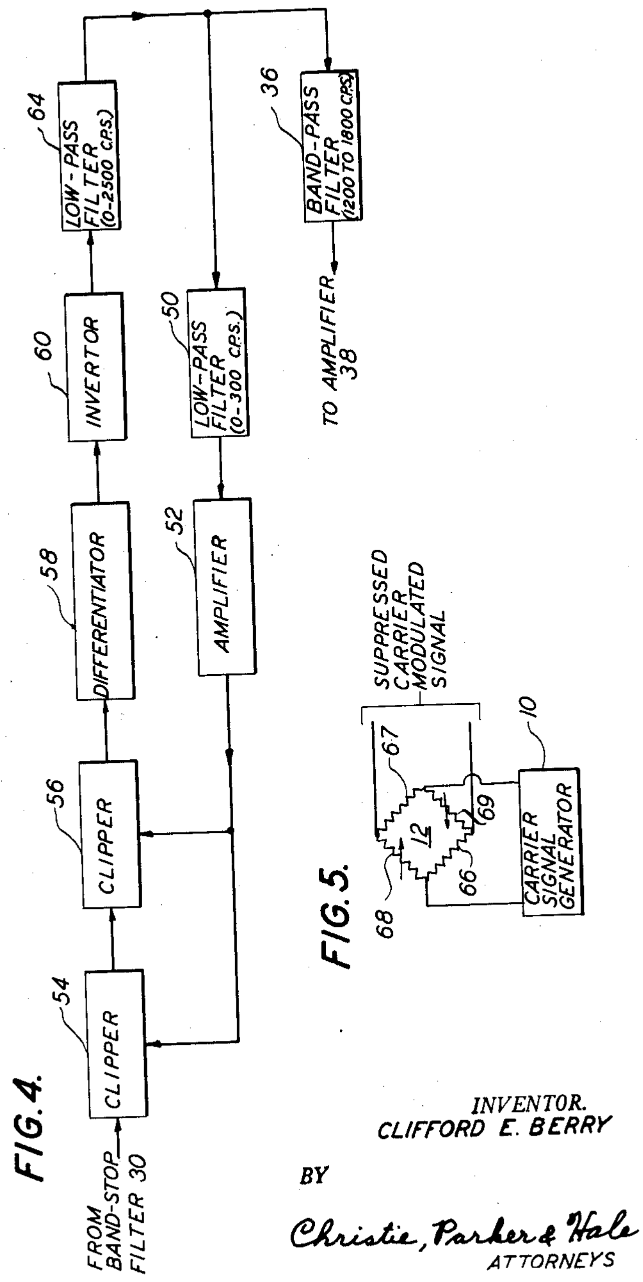
Fig. 5 shows an arrangement for producing suppressed-carrier modulated signals which may be employed in the various embodiments of the recording apparatus.

Various arrangements may be employed for controlling the magnitude of the output signals which are provided by the demodulator 34. Figs 3 and 4 illustrate two such arrangements.

In the arrangement of Fig. 3 the demodulating apparatus comprises a pair of clipper stages 54 and 56 which serve to convert the signals which are applied to them to square wave signals. The square wave signals are applied to a differentiator 58 which provides pulse signals at the leading and trailing edges of each of the square waves. The output of the differentiator is applied to an inverter 60 which causes all of the pulse signals to have the same polarity. The output of the inverter is applied to a pulse former 62 which provides uniform pulse signals. The output of the pulse former is applied through a low-pass filter 64 to the band-pass filter 36 of the information channel and to the low-pass filter 50 of the flutter control circuit. The low-pass filter is arranged to have a sharp cut-off at a frequency slightly above the highest frequency which is to be reproduced, say at 2500 cycles per second. Thus, the low-pass filter rejects the frequency range at which the pulse signals occur, and it responds only to variations in the number of pulses which occur.

The magnitude of the output signals is controlled in the apparatus of Fig. 3 by varying the amplitude or the width of the pulses which are produced by the pulse former 62 in accordance with the magnitude of the signal which is provided by the amplifier 52.

The control arrangement of Fig. 4 is similar to that of Fig. 3 except that the pulse former is omitted, and the control action is effected by controlling the clipping level of the clippers 54 and 56 in accordance with the magitude of the output signal provided by the amplifier 52.

The source of suppressed-carrier modulated signals for the various embodiments of the invention may be various types. Fig. 5 illustrates one such arrangement wherein the carrier signal is applied to the input circuit of a four-arm bridge. Two opposed arms 66 and 67 provide constant resistance, and the other two opposed arms 68 and 69 provide resistances which vary in opposite directions in response to the intelligence to be recorded. By way of example, the resistance arms 68 and 69 may be two active arms of a pressure-responsive transducer, and the other two arms 66 and 67 may be inactive arms of the transducer. The output of such a bridge arrangement provides a suppressed-carrier signal which is modulated in accordance with the variations in resistance of the arms 68 and 69.

Figure 6:
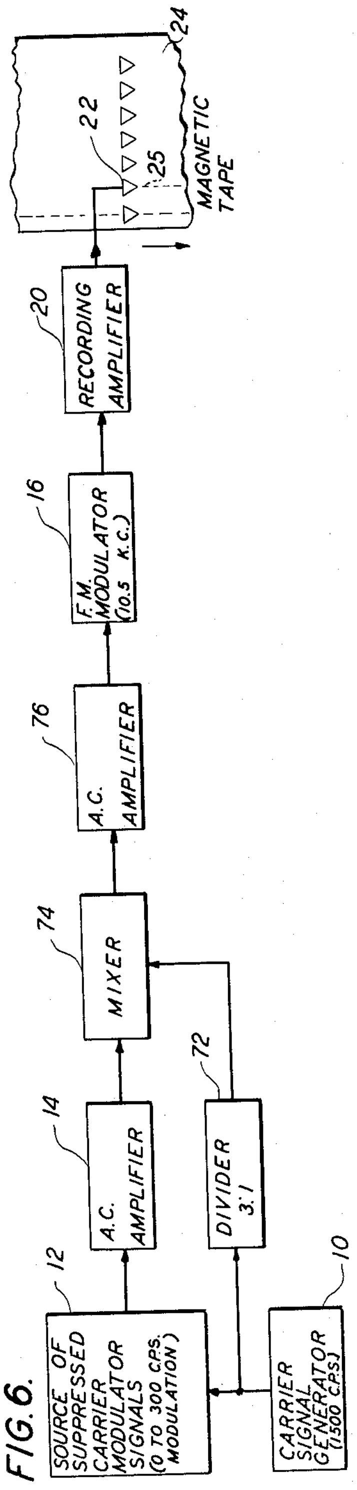
Figs. 6 and 7 show another arrangement for recording and reproducing intelligence employing the flutter correction techniques of the present invention.
Figure 7:
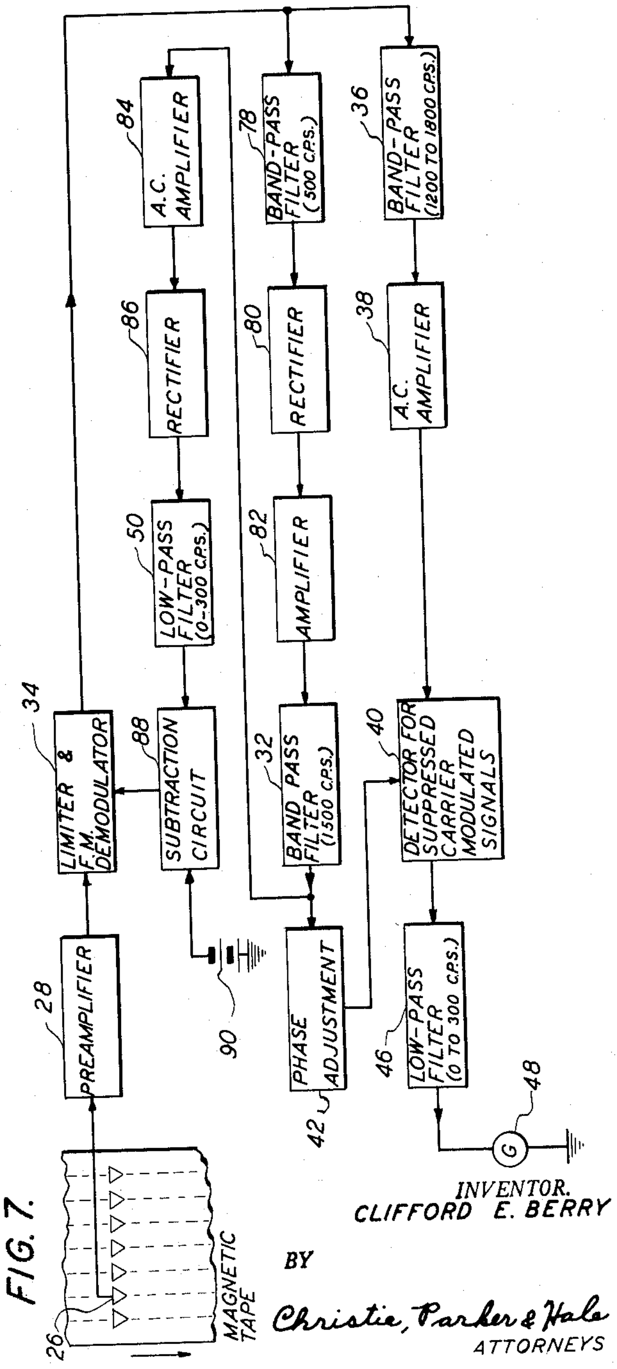

Figs. 6 and 7 show an alternative compound modulation system wherein both the suppressed-carrier modulated signal and a version of the carrier signal are frequency modulated before being recorded on the magnetic tape. Control action is effected in this embodiment of the invention by detecting changes in the amplitude of the carrier reference signal and controlling the action of the demodulator in accordance with such changes.

With reference to Fig. 6, the signal which is produced by the carrier signal generator 10 is applied through a three-to-one divider 72 which provides an output signal having one-third the frequency of the carrier signal. This version of the carrier signal, and the suppressed-carrier modulated signal are applied to a mixer 74. The output of the mixer is applied through an A.C. amplifier 76 to the F.M. modulator 16, and the two frequency-modulated signals are applied through the recording amplifier 20 to the recording head 22.

When the magnetic tape is passed adjacent the reproducing head 26 of the apparatus of Fig. 7, the two signals are reproduced. They are applied through the preamplifier 28 to the demodulating apparatus 34. The demodulator derives the suppressed-carrier modulated signal which is applied through the band-pass filter 36 and the A.C. amplifier 38 to the detector 40. The demodulator also derives the divided version of the carrier signal which is applied through a band-pass filter 78 which is tuned to pass the divided signal. The output of the band-pass filter 78 is applied through a rectifier 80, an amplifier 82, a band-pass filter 32, and a phase adjustment 42 to the detector 40. The rectifier 80, the amplifier 82, and the band-pass filter 32 serve as a frequency multiplier having a three-to-one ratio so that it restores the carrier signal to its original frequency of 1500 cycles per second. As before, the output of the detector is applied through a low-pass filter 46 which is tuned to the frequency range of the intelligence to be reproduced, and the output of the filter 46 may be coupled to a galvanometer 48.

In this embodiment of the invention, the control apparatus is responsive to the carrier reference signal which is produced by the demodulator. Since the divided version of the carrier reference signal may have a frequency which is close to that of the frequency range of flutter, it is desirable that the control apparatus respond to the carrier reference signal after it has been multiplied back to its original frequency, say to 1500 cycles per second.

This signal is available at the output of the band-pass filter 32.

Thus, the output of the band-pass filter 32 is applied through an A.C. amplifier 84, a rectifier 86, and the low-pass filter 50 to a subtraction circuit 88. The rectifier acts as an amplitude modulation detector. The amplitude of the carrier reference is in effect amplitude modulated by the speed variations in the tape by the action of the F.M. demodulator as described above in connection with Fig. 2. Hence the output of the rectifier 86 is a signal whose variations in amplitude are directly related to the variations in tape speed during play-back. The rectifier output includes a D.C. component due to the average amplitude of the reference carrier signal. This D.C. component is balanced out by a source of potential 90 also coupled to the subtraction circuit, and the subtraction circuit provides an output signal which is equal to the difference between the potential 90 and the signal which is applied through the low-pass filter 50. Due to the action of the rectifier 86 and the low-pass filter 50, the signal which is provided at the output of the low-pass filter 50 varies only with variations in the amplitude of the carrier reference signal. The signal which is provided at the output of the subtraction circuit is applied to the demodulator 34 and it serves to control the magitude of the output signals which are provided by the demodulator inversely with the magitude of the signals which are provided by the low-pass filter 50 so as to compensate for changes in the speed of the tape while the signals are recorded on and reproduced from the tape. The demodulator 34 of Fig. 7 may be either of the types shown in Figs. 3 and 4.

The frequencies which are illustrated for the apparatus of Figs. 6 and 7 are merely illustrative, and it will be apparent that various other frequency arrangements may be employed. A divided version of the carrier signal is recorded on the magnetic tape in the embodiment of Fig. 6 because the carrier itself has a frequency which would interfere with the frequency modulation of the suppressed-carrier modulated signal. It will be apparent that the division ratio may be other than three-to-one. Also, a reference signal having a frequency higher than that of the carrier may be employed by using a multiplier instead of the divider 72.

Figure 8:
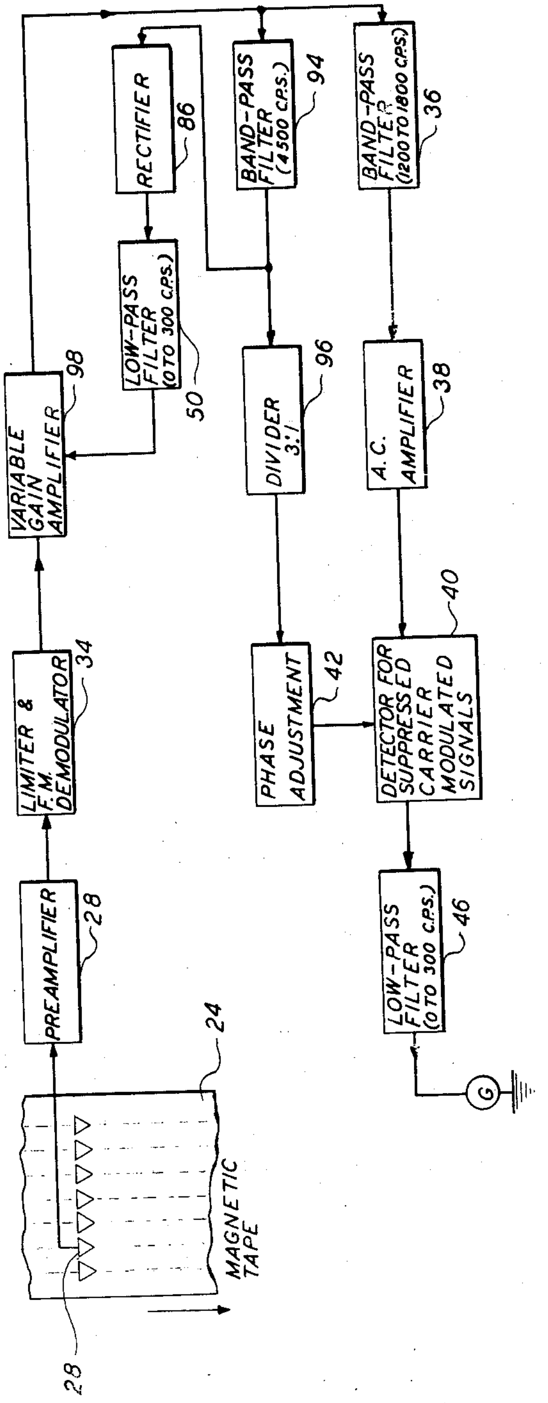
Fig. 8 shows a modification of the apparatus of Fig. 7.

If a three-to-one multiplier is substituted for the divider 72 of Fig. 6, the carrier frequency recorded on the tape is 4500 cycles per second. Fig. 8 illustrative a playback arrangement for such a record. The carrier reference signal is separated from the information signal by a band-pass filter 94 which is tuned to the frequency of the multiplied carrier, say to 4500 cycles per second. The output of the band-pass filter 94 is applied through a divider 96 and a phase adjustment 42 to the detector, with the carrier being reduced to the same frequency and having the same phase as the original carrier signal produced by the source 10.

The rectifier 86 of the control apparatus may be coupled to the output of the band-pass filter 94, as illustrated, or to the output of the divider 96, so as to respond to changes in the amplitude of the carrier reference signal.

In this embodiment of the invention a variable gain amplifier 98 is coupled to the output of the demodulator 34, and the output of the low-pass filter 50 is employed to vary the gain of the amplifier inversely with the magnitude of the signals which are provided by the low-pass filter.

If desired, a variable gain amplifier, such as the amplifier 98 of Fig. 8, may be employed at the output of the F.M. demodulator of the embodiments of either Fig. 2 or Fig. 7, and the control action may be effected by varying the gain of the amplifier instead of by controlling the action of the demodulator itself.

I claim:

1. In apparatus for reproducing intelligence wherein a carrier reference signal and a suppressed-carrier signal which is modulated in accordance with the intelligence to be reproduced are recorded magnetically along the same channel of a recording medium, with at least the suppressed-carrier signal being recorded in the form of a frequency-modulated signal, and having playback apparatus including demodulating means for demodulating the frequency-modulated signals which are derived from the recording medium, the improvement which comprises frequency-responsive means including filters coupled to the output of the demodulating means for separating the suppressed-carrier signal from any noise signals having frequencies in the range of normal rates of speed variation in the tape, and means coupled to the noise signal output of the frequency-responsive means for adjusting the magnitude of the signals which are provided by the demodulating means inversely with changes in the magitude of the signals which are provided by the frequency-responsive means to compensate for amplitude changes in the output of the demodulating means with changes in the speed of the recording medium.

2. The apparatus of claim 1 wherein the frequency-responsive means includes a band pass filter tuned to the frequency of the carrier reference signal which is produced at the output of the demodulating means, and means for detecting the amplitude modulation of the carrier reference signal resulting from the speed variations in the recording medium during the play-back.

3. The apparatus of claim 1 wherein the frequency-responsive means includes a low pass filter coupled to the output signal derived from the demodulator for passing signal frequencies in the range of the variations in the speed of the tape while the frequency-modulated version of the suppressed-carrier signal is being recorded on or read from the recording medium.

4. In apparatus for reproducing intelligence having first and second modulators for recording a compound-modulation signal on magnetic tape, the second modulator being a frequency modulator, and having first and second demodulators for reproducing the intelligence from the compound-modulated signal read off the tape, the first demodulator being a frequency discriminator, the improvement comprising filter means coupled to the output of the first demodulator for separating out signal components in the output of the first demodulator produced by variation in tape speed from the signal components produced by the modulated signal, means for coupling the signal components corresponding to the modulated signal to the second demodulator, and means responsive to the signal components corresponding to the tape speed variations for adjusting the magnitude of the signal applied to the filter means from the first demodulator in inverse relation to the changes in magnitude of the signal components corresponding to tape speed variations.

5. Apparatus as defined in claim 4 wherein said last-named means includes a variable gain amplifier coupled to the output of the first demodulator, the gain being controlled in inverse relation to changes in magitude of the signal components corresponding to tape speed variations.

6. Apparatus as defined in claim 4 wherein said last-named means includes means for modifying the transfer characteristic of the first demodulator.

7. In apparatus for recording and reproducing intelligence having means for producing a suppressed-carrier modulated signal representing the intelligence, means for producing a frequency-modulated version of the suppressed-carrier modulated signal, means for magnetically recording the frequency-modulated signal and for simultaneously recording a frequency-modulated version which is a frequency multiple of the carrier signal from which the suppressed-carrier modulated signal was derived along the same recording channel, means for reproducing the two magnetically recorded signals, means including a demodulator for deriving a suppressed-carrier modulated signal and the frequency multiple version of the carrier signal from the reproduced frequency-modulated signal, and a detector coupled to receive the derived suppressed-carrier modulated signal and a frequency multiple version of the carrier signal for producing an output signal which represents the original intelligence, the improvement which comprises a frequency-responsive network coupled to the output of the demodulator for passing signals having a predetermined frequency range below the frequency of the suppressed-carrier modulator signal and the frequency of the carrier signal from which the supressed-carrier signal was derived, and means coupled between the output of the frequency-responsive network and the demodulator for changing the magnitude of the output of the demodulating means inversely with the changes in the magnitude of the signals which are conveyed through the frequency-responsive network to compensate for amplitude changes in the demodulator output due to speed variations which occur while the signals are being recorded and reproduced.

8. The apparatus of claim 7 wherein the frequency-responsive network includes a band pass filter tuned to the frequency of a frequency multiple version of the carrier signal, and means for detecting amplitude modulations of the frequency multiple version of the carrier signal, the output of the detecting means being coupled to the magnitude changing means.

References Cited in the file of this patent

UNITED STATES PATENTS

| | | |
|---|---|---|
| 2,604,533 | Koros | July 22, 1952 |
| 2,668,283 | Mullin | Feb. 2, 1954 |
| 2,685,069 | Hoeppner | July 27, 1954 |
| 2,713,677 | Scott | July 19, 1955 |
| 2,807,797 | Shoemaker | Sept. 24, 1957 |